United States Patent [19]

Allezard et al.

[11] Patent Number: 4,656,480
[45] Date of Patent: Apr. 7, 1987

[54] MONOPULSE FM-CW RADAR SYSTEM WITH IMPROVED AXIS STABILITY

[75] Inventors: Roland Allezard, Verrieres le Buisson; Jean-Luc Degouy, Antony, both of France

[73] Assignee: U.S. Philips Corporation, New York, N.Y.

[21] Appl. No.: 671,663

[22] Filed: Nov. 15, 1984

[30] Foreign Application Priority Data

Nov. 23, 1983 [FR] France ................. 83 18656

[51] Int. Cl.$^4$ .................................. G01S 13/68
[52] U.S. Cl. ................................ 342/151; 342/169
[58] Field of Search ........... 343/16 M, 17.7; 342/80, 342/149-154, 165, 169-174

[56] References Cited

U.S. PATENT DOCUMENTS 3,167,768 1/1965 Rosen ...................... 343/17.7
3,221,328 11/1965 Isch ....................... 343/16 M
3,883,870 5/1975 Kunz ...................... 343/17.7
3,943,514 3/1976 Afendykiw et al. ......... 343/16 M X

FOREIGN PATENT DOCUMENTS 2041178 1/1971 France .

Primary Examiner—Thomas H. Tarcza
Assistant Examiner—Bernarr Earl Gregory
Attorney, Agent, or Firm—Robert J. Kraus

[57] ABSTRACT

The radar comprises in known manner a transmitter (1), a transmitting antenna ($E_1$), two receiving antennas ($R_1,R_2$), mixers (6,7) and means for processing the subtractive beat signals supplied by the mixers for effecting detection of the bearing of a target (10) and of the range and/or the relative velocity of the target. According to the invention, a target simulator is provided to correct the phase errors of electrical and mechanical origins. The simulator comprises a transmission circuit including a modulator (11) and a simulated target echo transmission antenna ($E_2$) which transmits towards the receiving antenna. The radar also includes means for processing a beat signal derived from the simulated echo and for effecting detection of the simulated target bearing and means for correcting phase errors.

10 Claims, 6 Drawing Figures

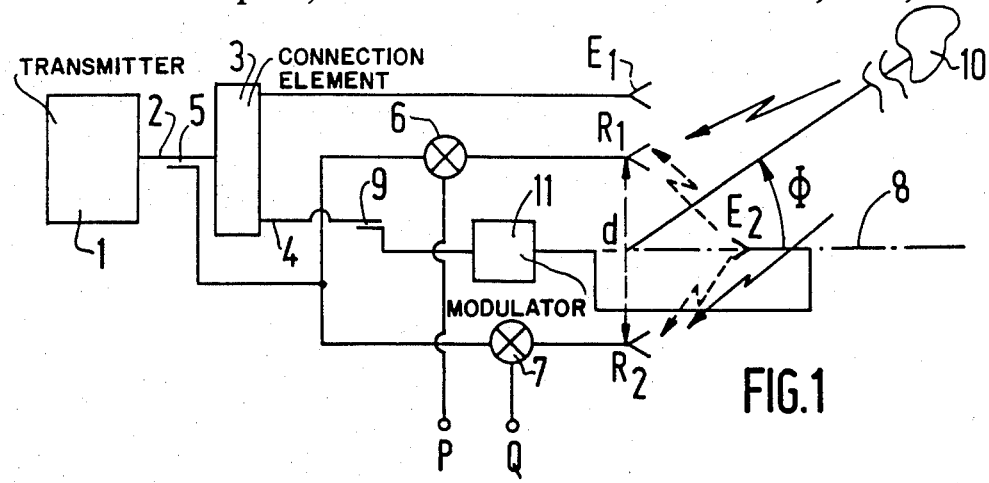
FIG.1
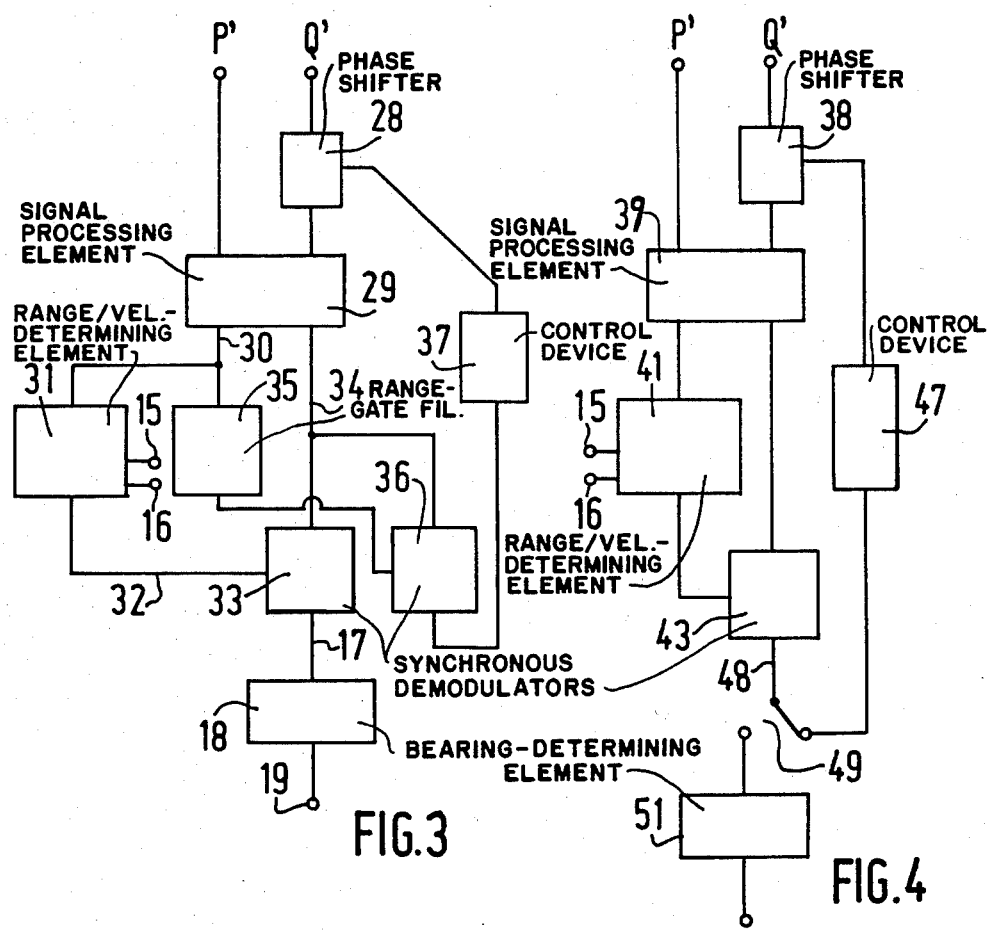
FIG.3
FIG.4

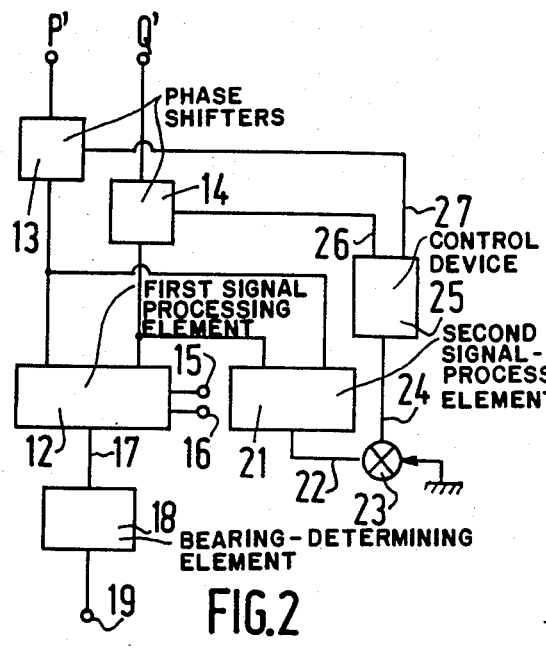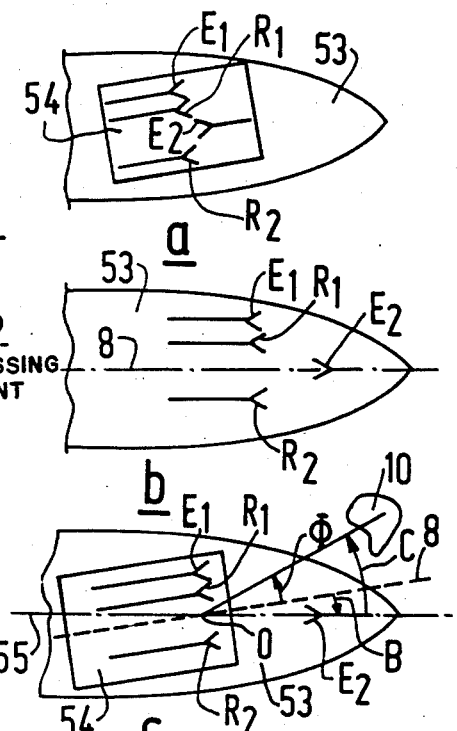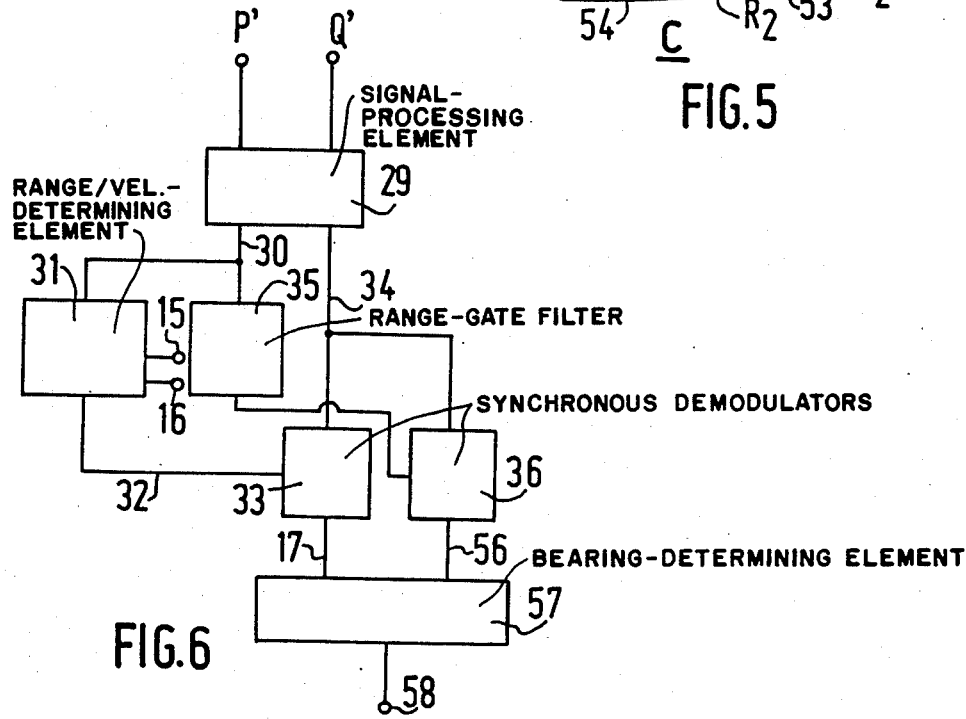

MONOPULSE FM-CW RADAR SYSTEM WITH IMPROVED AXIS STABILITY

BACKGROUND OF THE INVENTION

The invention relates to a monopulse FM-CW radar system comprising a transmitter, an antenna array of a transmitting antenna and at least two receiving antennas. Mixers supply the subtraction beat signal between the transmitted signal and each echo signal received by each receiving antenna after having been reflected from a target. The system also includes means for processing the beat signals for effecting detection of the target bearing as well as detection of the range and/or relative velocity of the target within a range gate of a predetermined width.

The invention is used to the best advantage in simplified radar equipment, preferably air-borne equipment, and must have the properties of being sturdy, compact and inexpensive. It relates more specifically to radar equipment for missiles.

Monopulse FM-CW radar systems are known and described in, for example, Radar Handbook, Skolnik, published by Mc Graw-Hill Book Company, edition of 1970, pages 21-10 to 21-30. These radars operate with one single pulse transmitted either in two orthogonal planes or in a sole plane (in plan position, for example). For the sake of simplicity of the description, it will be limited hereinafter to the last-mentioned case. A monopulse FM-CW performs angular detection (bearing) and range and/or velocity detection. The angular detection is obtained by comparing the phase of the signals received on the antenna (the description will be limited to two receiving antennas). If two antennas $R_1$ and $R_2$ spaced by d receive a signal coming from the direction which is at an angle $\phi$ with the axis of the array of receiving antennas $R_1$ and $R_2$, the phase shift $\phi$ between the signals received by the respective antennas $R_1$ and $R_2$ is expressed by:

$$\phi = 2\pi \frac{d}{\lambda} \sin \phi \qquad (1)$$

$\lambda$ being the wavelength of the radiated wave. If the diagrams of the antenna are assumed to be identical, this implicates that the two fields $E_1$ and $E_2$ received as an echo from a target are equal and in-phase for $\phi=0$. It is then possible to control the assembly $R_1$, $R_2$ to their correct positions, by means of the value of the difference of the two received fields, which are standardized with respect to their sum. For example:

$$E_1 = E_o \cos(\omega t - \phi/2) \qquad (2)$$

$$E_2 = E_o \cos(\omega t + \phi/2) \qquad (3)$$

$$\frac{E_2 - E_1}{E_2 + E_1} = \frac{-2 E_o \sin \omega t \sin \phi/2}{2 E_o \cos \omega t \cos \phi/2} = -\frac{\sin \omega t \sin \phi/2}{\cos \omega t \cos \phi/2} \qquad (4), (5)$$

or in amplitude (with an accuracy of one quadrature):

$$\frac{|E_2 - E_1|}{|E_2 + E_1|} = tg\, \phi/2 \qquad (6)$$

In practice, radars of the above-defined type render it possible to obtain from the sum and the difference of the subtractive beat signals, and more specifically by means of synchronous demodulators, a term of the form: $k \sin \phi$ where $k$ is a constant which can be determined.

Comparing the phases is consequently the parameter which defines the angular precision of the system. This comparison may be realized directly in high frequency, which necessitates a very good control of the phases of all the components located upstream of the differential stage (TOS of the junctions and the antennas). The simplified equipment which is the object of the invention comprises in principle no components, operating in the high-frequency range, of such a precision and of such a complex construction. This comparison may alternatively be effected after a change in frequency, which is the case for radars to which the invention applies. Then, in addition to the phase errors introduced by the high-frequency input stage, phase errors are introduced by the amplifiers and the mixers.

On the other hand, the range detection is obtained by observing the correlation signal between transmission and reception. In, for example, the case of transmitting a linearly modulated signal having a frequency deviation F during the time T, the signal is delayed on reception by the value:

$$\tau = 2\, D/c \qquad (7)$$

c being the velocity of the electromagnetic wave and D the range of the target, and is shifted by the Doppler effect characterized by the beat frequency:

$$f_d = 2\, v/\lambda \qquad (8)$$

where v is the velocity with respect to the target or the Doppler velocity. In these circumstances, the useful subtractive beat signal has a frequency $f_b$, such that:

$$f_b = \frac{\Delta F}{T} \tau - f_d \qquad (9)$$

The value of $f_d$ can be isolated by means of a specific known processing of the beat signals, which renders it possible to known the value v and, in addition, the use of the formulae (7) and (9) enables the determination of D. This greatly simplified example shows that the range gating is performed by the equivalent of a frequency filter. Obviously, in the real case of a radar the receiving periods are in general distinct from the transmission periods to avoid the saturation phenomena of the receiver. Then a local oscillator performs the part of a reference signal, but the operation is similar.

Radars of a very simple contruction intended for proximity fuses or for use as automatic direction finders may remain simple and without critical adjustments. In the case of FM-CW radars such as defined above, the control of the phase identity during manufacture and in the time is critical.

SUMMARY OF THE INVENTION

The invention has for its object to correct the phase errors which occur both at the high-frequency end of the radar and at the intermediate frequency end.

This object is accomplished and the disadvantages of the prior art are obviated by means of a radar system such as that described in the opening paragraph, but which is characterized in that it comprises a target simulator intended to correct the phase errors caused by electrical and mechanical imperfections in the radar system and which degrade the determination of the angular or bearing of the target. The target simulator comprises a transmission network capable of being connected to the transmitter and including a modulator, and a simulated target echo transmission antenna which transmits towards the receiving antennas and has a geometrical position relative to the receiving antennas which is known either from its construction or by means of measurements. The system also comprises means for processing the simulated target echo beat signal to effect an angular detection of the simulated target and means for correcting the phase errors.

A simple way to realize a simulated target echo signal is to modulate the transmitted signal by a high multiple of the repetition frequency, which may be considered to be a false Doppler effect, this procedure being usually employed to realize simulators. Preferably, the modulator used is a single side-band modulator. The phase shifts due to in-system phase errors appear for the beat signals obtained from the simulated target with the same value as for the beat signals obtained from the true target. The guiding principle of the invention is to evaluate the global parasitic phase shift which may be known from the fact that the transmission direction of the simulated target is known and by deducting the value of this phase shift from the phase shift obtained for the true target of which one wants to know the position.

A first embodiment of the invention is characterized in that the simulated transmitting antenna is an integral part of the antenna array and is equidistant from the receiving antennas. The correction means controls the phase of at least one of the subtractive beat signals, and is suitable for cancelling in a first approximation the phase errors. The correction means comprises a loop system constituted by at least one phase shifter located in a processing chain of a subtractive beat signal, a measuring element for measuring the residual phase shift relative to the simulated target between said chain and a similar circuit and an integrating control element whose output controls the phase shifter.

In accordance with this first embodiment, the elements for measuring the phase shift may be separate elements according to whether subtractive beat signals relative to the simulated target or to the true target are concerned. The phase shifts are then measured simultaneously and the range gates for the simulated target and for the true target are separate. During the period in which the radar is utilized, the range of the target during searching or lock-in, and also the probable velocity (Doppler frequency) thereof, are generally known. It is therefore easy to place the frequency of the simulator, that is to say the simulated range and/or the simulated velocity, outside the surveillance range of the target. It is therefore possible to permanently control the phase shift to maintain the zero shift on the axis of the array of receiving antennas defined only by a geometrical position. In a further variation of the first embodiment of the element measuring the phase shift relative to the simulated target may be the same element which is used for measuring the phase shift relative to the true target. The output of the common phase shift measuring element is then switchable, by means of change-over switches, alternately connecting the measuring element to the control element and to an angle measuring element which is part of the processing means for determining the bearing of the true target.

A second embodiment of the radar system according to the invention in which the array of antennas forms one whole with an automatic direction finder installed on a mobile missile, is characterized in that the simulated transmission antenna is arranged on a mobile missile in such a way that the straight line connecting the array of antennas to the simulated transmission antenna is substantially parallel with the axis of the mobile missile and in that the phase correction means are constituted by first means for determining relative to the axis of the antenna array an angle $\beta$ which is representative of the position of the simulated target and second means for subtracting the angle $\beta$ from the angle $\phi$ which is representative of the position of the true target relative to the axis of the antenna array, so as to obtain the angle $\gamma$ which is representative of the angle between the axis of the mobile missile and the direction of the target. In this last case a phase control loop is not necessary, because the angle searched for is obtained from the difference of the two measured angles and the phase errors, which are substantially the same for each of the two measured angles, cancel each other out during the calculation of their difference.

BRIEF DESCRIPTION OF THE DRAWING

The following description, which is given by way of example with reference to the accompanying drawing figures, will make it better understood how the invention can be put into effect:

FIG. 1 shows by means of a block diagram the antenna system of the radar according to the invention and its power supply;

FIG. 2 is a conceptual block diagram of the signal processing portion for the first embodiment of the invention;

FIGS. 3 and 4 are practical block diagrams similar to that of FIG. 2, for two possible variations of the first embodiment; and FIGS. 5a, 5b, 5c show three possible locations of the antenna system on the aircraft;

FIG. 6 is a block diagram similar to those of FIGS. 3 and 4 for the second embodiment of the invention.

DESCRIPTION OF THE PREFERRED EMBODIMENTS

In the Figures, components having the same functions have been given the same reference numerals.

In FIG. 1, a mono pulse FM-CW transmitter 1 transmits from the transmission antenna $E_1$ via a high-frequency line 2 and a connection element 3. The element 3 which has a second high-frequency output 4 may either be a two-position high-frequency change-over switch which enables switching of the transmission signal to the antenna $E_1$ or to the line 4, or a high-frequency connection which transmits the transmission signal simulatenously via the antenna $E_1$ and via the line 4. The transmission signal is taken from the line 2, for example with the aid of a coupler 5, which is connected to the first inputs of a mixer 6 and a mixer 7, second inputs of which are connected to receiving antennas $R_1$ and $R_2$, respectively. The antennas $R_1$ and $R_2$ are spaced by d, d being rather small, and are disposed on opposite sides of an axis denoted by reference numeral 8. The respective outputs of the mixers 6 and 7 are connected to points P and Q. The above-described structure, disregarding the element 3, is substantially the structure of a conventional FM-CW radar system which may be mounted on an automatic direction finder.

According to the invention, the high-frequency line 2 is also connected to a second transmitting antenna $E_2$, via the connection element 3, the line 4 of an optional coupler 9 and a modulator 11. Any change-over actions of the transmission signal and attenuation of the signals symbolized by the couplers 5 and 9 are controlled as a function of the range of the target in accordance with conventional rules for avoiding blinding of the receiving assembly (antennas $R_1$, $R_2$ and mixers 6,7). Receiving signals either coming from the antenna $E_1$ after reflection from a target 10, or coming directly from the antenna $E_2$ are captured by the antennas $R_1$ and $R_2$ which define the conventional measuring base of monopulse radars. Mixing the local oscillator signal on the one hand and the signals received by the antennas $R_1$ and $R_2$, respectively in mixers 6 and 7 produces the subtractive low-frequency beat signals at the points P and Q. In parallel with the local oscillator signal, the transmission signal is taken off and is conveyed through the modulator 11, simulating a false echo at a range and/or a velocity which is different from that of the target 10. This signal is radiated with a delay which is so short as to be disregarded, by the phase reference horn of the antenna $E_2$ located, for example, in the median plane of the phase centers of the receiving antennas $R_1$ and $R_2$, that is to say on the axis 8 in FIG. 1. If the connection element 3 is a change-over switch, the attenuation of the signal transmitted by the simulated target echo transmission antenna $E_2$, which is symbolized by the coupler 9, is a comparatively low and of the order of, for example, 20 dB. In contrast therewith, in the event in which element 3 is a simple connection, the attenuation of the signal on antenna $E_2$ is preferably much more significant and of the order of approximately 50 dB. By way of comparison, the received echo signal coming from the true target 10 is attenuated by approximately 80 dB. When these precautions are taken, the subtractive beat signals in the points P and Q are suitable for use and may be processed as described hereinafter. Demodulator 11 may be in the form of a delay line, which has for its advantage that it produces a simulated signal which very closely resembles a true echo signal of a true target, but it has the disadvantage that it is a complicated solution, as it is intricate, expensive and a high-loss solution.

It is actually not necessary to produce such a complicated signal. In actual practice, the modulator 11 has for its function to introduce a modulation of parasitic frequencies which may be interpreted as a delay. The signal transmitted by $E_2$ comprises several lines in its spectrum and the system portion downstream of the antennas $R_1,R_2$ behaves as a filter, and is capable of selecting the proper line in the spectrum of the simulated signal. This function can be easily realized in a radar of the type under consideration, as it is identical with the function of the range gate. The modulator 11 effects, for example, a frequency shift with the aid of a single-sideband modulator, but it is alternatively possible for the modulator 11 to effect a simple cut-off of the transmission signal originating from the transmitter 1. Then a signal having two sidebands and a subcarrier is obtained at the output of modulator 11, the lower sideband being the sideband the remaining part of the system takes into account. A person skilled in the art can easily adapt the system such that taking the lower sideband into account in the system can be effected without any ambiguity.

The signal processing circuitry shown in FIG. 2 comprises a prior art portion and a portion according to the invention. The prior art portion is formed by a processing element 12 which is of common usage in all monopulse radar systems. The element 12 receives the beat signals coming from the mixers 6 and 7, it being assumed that the points P' and Q' are connected to the points P and Q, and elements 13 and 14 are assumed to be absent for the moment. In the element 12 the sum and the difference of the received beat signals are taken and the range D of the target and the Doppler velocity v, which appears in the form of electric signals at the outputs 15 and 16, respectively are determined. A function, usually a trigonometrical function, of the angle $\phi$ as defined above appears at a third output 17, which angle is representative of the angle $\phi$ which characterizes the position of the target. In the element 18 which is located downstream the calculation of $\phi$ and the calculation of $\phi$ as a function of $\phi$ is effected, for example, on the basis of the above formula (1) and the angle $\phi$ appears in the form of an electric signal at the output terminal 19. In the absence of the elements 13 and 14, which are phase shifters, the angle $\phi$ and consequently the angle $\phi$ are beset with phase errors which arise along the overall processing circuit of the above-described system. The invention has for its main object to correct these errors. To that end, the system comprises a second signal processing element 21 which is arranged in parallel with the element 12, and selects from the beat signal, by a suitable filtering mode, only the components which relate to the simulated target and processes only phase shifts relating to these components. The sole output 22 of the element 21, which is a homologue of the output 17 of the element 12, is the origin of a signal which is representative of the phase errors occurring upstream of the system, it being assumed that the phase shifters 13 and 14 themselves do not introduce any phase shift. The phase shifters 13 and 14 respond to the signal at the output 22 in such a way that these phase shifters effect a phase shift which is substantially equal and of opposite sense to the phase errors, thereby cancelling the signal at the output 22. Therefore the element 21 is in the form of a residual phase shift measuring device. The above function is realized in a simple way by means of a control loop: the signal at the output 22 is compared with the zero value in a mixer 23, a further input of which is connected to ground and whose output 24 is connected to a control device 25. The device 25 is essentially an amplifier-integrator and may be constituted by, for example, a differential amplifier which is arranged as an integrator. The two outputs of the device 25, which are connected to the control input of the phase shifters 13 and 14, respectively are the source of electric quantities which have the same absolute values and opposite signs. The result obtained is that the phase of one of the beat signals is shifted, for example at point p' through an angle $\alpha/2$ and the other beat signal in, for example, point Q' through the angle $-\alpha/2$, the angle being equal in a first approximation to the phase error introduced by the portion of the system shown in FIG 1. It will be obvious that the mixer 23 is shown, in FIG. 2, only for didactic purposes. Actually, when comparing the signal on the conductor 22 to zero the signals on the conductors 22 and 24 are always identical, and in practice the mixer 23 is superfluous and is therefor not shown in FIGS. 3, 4 and 6. In the same way as the majority of the internal phase errors of the system are corrected as described above for the simulated target transmission signal, also the phase errors for the useful signal reflected from the true target are corrected. As a result, the values of the angles $\phi$ and $\phi$ calculated in the element 18 can be determined with a rather high precision. It should be noted, with reference to FIG. 2, that the phase shift measuring devices are separate in so far as they relate to the true target (device 12) or the simulated target (device 21).

FIG. 3 shows a practical embodiment of the conceptual circuit of FIG. 1. A single phase shifter 28 in the path of one of the two beat signals makes it possible to recover the phase having the value $\alpha$ in accordance with the invention. After phase correction, the two beat signals at P' and Q' are transmitted to a processing element 29 which takes the sum and the difference between these signals. The sum signal is transmitted via a conductor 30 to an element 31 which determines the range and the Doppler velocity v transmitted in electrical form to the outputs 15 and 16 and filters the sum signal with the aid of appropriate filters, so that in this signal only the components which relate to the range gate to be attributed to the true targets to be detected are preserved, and transferred thereafter to an output conductor 32. The signal on the conductor 32 is applied to the reference input of a synchronous demodulator 33 a second input of which receives via a conductor 34 the difference signal of the beat signals originating from the element 29. The signal at the output of the demodulator 33 which has, for example, the form: k sin $\phi$, is thereafter processed by the element 18, and the output 19 is the source of an electric signal representative of the angle $\phi$. The above-described portion of FIG. 3 is known, with the exception of the phase shifter 28. According to the invention, the sum signal on the conductor 30 is also transferred to the element 35 which has for its object to filter the sum signal with the aid of appropriate filters which are different from those of the element 31, so as to preserve in this signal only the components relating to the range gate for the simulated target. To obtain a proper separation of the filtered sum signals for the true and the simulated targets it is necessary, in this embodiment, to effect an adequate separation of the far ports for the true targets and the simulated target. If, for example, a true target is expected beteen 100 and 200 km, the radar effecting a scan of 100 to 200 km, the range of the simulated target may be fixed at a value less than 100 km and, for example, equal to 50 km. If a true target is expected between 0 and 100 km, the range of the simulated target must be over 100 km. Thus, at the output of the element 35 a filtered sum signal is obtained for the simulated target which is transmitted to the reference input of a second synchronous demodulator 36, a second input of which is connected to the conductor 34 which carries the difference signal of the beat signals. The output signal of the demodulator 36, which is comparable to the error signal of the control loop, is similar to the signal on the conductor 22 of FIG. 2. This error signal which should be rendered as long as possible is transferred to the integrating control device 37 whose output controls the phase shifter 28. The embodiment shown in FIG. 3 requires two processing elements 31 and 35 for the sum signal and two synchronous demodulators 33 and 36. It is possible to simplify the system by means of adopting a sequential operating mode, as known in FIG. 4.

FIG. 4 comprises the elements 38, 39, 41, 43 and 47 which are similar to the elements 28, 29, 31, 33, and 37 of FIG. 3 and having the same interconnections as in FIG. 3. The elements which are similar to the elements 35 and 36 of FIG. 3 are absent and the output 48 of the synchronous demodulator 43 can be connected via a two-position change-over switch 49 to either the input of the control device 47 or to the input of the element for calculating the angle $\phi$, denoted by reference numeral 51. In this embodiment, the element 47 must be provided with means for maintaining the control signal when the loop is opened by the change-over switch 49 (the position opposite to that shown in the Figure). The element 47 must then include either a capacitor whose charge constitutes a storage of the signal when it operates in the analogue mode, or a memory when it operates in the digital mode. Two operating modes are possible for the embodiment shown in FIG. 4, depending on whether the transmission via the antennas $E_1$ and $E_2$ (FIG. 1) is sequential or simultaneous. If the emission is sequential, the connecting element 3 being a high-frequency switch, the far ports for the simulated target and for the true target may be the same and the same elements, more specifically the same filters, serve to filter, in the element 41, the sum signal for the simulated target and for the true target. The change-over switch 49 is then controlled, in a manner not shown, in synchronism with the change-over switch 3 (FIG. 1), in such manner that when the antenna $E_2$ transmits it must be in the position shown in the Figure and in the opposite position when the antenna $E_1$ transmits. If, in contrast therewith, the transmission effected by the antennas $E_1$ and $E_2$ is simultaneous, the components owing to the true target and to the simulated target appear at the same time in the beat signals and the range gates must be separated as in the embodiments shown in FIGS. 2 and 3. It is then necessary to provide, in the element 41, an internal switch of the filters, not shown, controlled in synchronism with the change-over switch 49. Determination of the angles $\phi$ and $\phi$ in the element 51 is obtained sequentially each time the input of the element 51 is connected to the further portion of the system by means of the change-over switch 49. This sequential aspect is not a disadvantage compared to the embodiments shown in FIGS. 2 and 3, insofar as even for this last-mentioned embodiment the transmission by the transmitter in discontinuous. An advantage of the embodiments shown in FIG. 4 is that when the same signal processing circuit is used to the very end, which renders it possible to correct all the phase errors because of the capture and signal processing, which results in an optimum precision, in view of the correction means which are made operative in accordance with the invention.

So far the case has been described in which the antenna $E_2$ is arranged equidistantly from the antennas $E_1$ and $E_2$. This is illustrated in FIGS. 5a and 5b in which an aircraft or, more generally, a mobile missile is denoted by reference 53. In FIG. 5a, the array of antennas $E_1$, $E_2$, $R_1$, $R_2$ is shown mounted on a stabilized platform 54 which serves as an angular reference in the sense that it makes it possible to eliminate the generally erratic, rapid movements of the missile 53. In FIG. 5b, the array of antennas is fixed with respect to the missile 53 and its axis 8 is in parallel with that of the missile. For certain applications, for missiles in particular, it may be advantageous to arrange the antennas $E_1$, $R_1$, on a stabilized platform and the antenna $E_2$ and the center O around which the known array of antennas pivots, which marks the center of the segment interconnecting the antennas $R_1$ and $R_2$ being located in the plane of the Figure. The antenna $E_2$ is then generally no longer equidistant from the antennas $R_1$ and $R_2$ and two angles must be measured: the angle B between the axis 8 and the median plane 55 which indicates the position of the simulated target and the angle $\phi$ which indicates the position of the true target. The angle which must be determined in this case is the angle C which corresponds to the difference between the algebraic values of the angles, such as they are indicated in FIG. 5c. It should be noted that the phase errors of an electrical nature introduced in the system, which are the same for the determination of the angle B and the angle $\phi$ are reduced and consequently eliminated during the determination of the angle C. Correctly speaking, the elimination due to the difference does not act on the angles B and $\phi$ themselves, but on the phase shift angles $\phi$ for the angle $\phi$ and $\beta$ for the angle B, which represent them in the processing system. However, on the ground of the above formula (1) and given the fact that small angles are concerned for which the sign may be associated with the value expressed in radians, eliminating the searched for angular error holds true. The above considerations result in the embodiment shown in FIG. 6.

In FIG. 6 there is no phase shifter in the paths of the beat signals nor a phase control loop. As regards the remaining portion of the system, the same elements 29, 31, 33, 35, 36 of FIG. 3 are shown again, interconnected in the same way. The respective output conductors 17 and 56 of the synchronous demodulators 33 and 36 are connected to two inputs of an element 57, which has for its function to determine the angle C. The conductors 17 and 56 carry signals which have the respective shapes: $k \sin \phi$ and $k' \sin \beta$, the angles $\phi$ and $\beta$ here incorporating the phase errors due to the processing of the signal and the values of the constants k and k' may be known in a conventional manner. The element 57 determines in the first place the respective values of $\phi$ and $\beta$, thereafter the simplified formula (1) may be applied, that is to say:

$$\phi \simeq 2\pi \frac{d}{\lambda} \phi \quad (10)$$

$$\beta \simeq 2\pi \frac{d}{\lambda} B \quad (11)$$

$$|\gamma| = |\phi - \beta| \simeq 2\pi \frac{d}{\lambda} |\phi - B| \quad (12)$$

$$|\gamma| \simeq 2\pi \frac{d}{\lambda} |C| \quad (13)$$

from which the absolute value for the angle C can be deduced:

$$|C| \simeq \frac{\lambda}{2\pi d} |\gamma| \quad (14)$$

The value $|C|$ from which the phase errors due to the processing operation have been removed may thus be supplied in the form of an electric quantity to the output 58 of the processing system.

The advantages of the invention inherent to its applications can be summarized as follows: When the antenna $E_2$ for the simulated target is an integral part of the group of receiving antennas (FIGS. 5a and 5b), the system is similar to a conventional monpulse radar but the derivative of the axis is reduced. When the simulation antenna is fixed with respect to, for example, a missile radome (FIGS. 5b and 5c), the difference between the phase shift value measured on the signal from the antenna of the simulated target and on the antenna signal of the true target gives the position of this true target relative to the missile, provided the radiation diagram is sufficiently large. This last possibility may be interesting when the velocity of the missile is large compared with the transversal velocity of the target: the angle of excursion of the automatic direction finder is then less than the width of the antenna diagram on the one hand and the axis of the missile substantially coincides with the trajectory of the missile on the other hand. The phase shift measured between the target signal and the simulated signal may then render it possible to omit the stabilized platform which is used as a reference, so that the arrangement shown in FIG. 5c is then the same as the arrangement shown in FIG. 5b. This simplified arrangement may more specifically be used with a low-cost anti-ship automatic direction finder.

What is claimed is:

1. A monopulse FM-CW radar system comprising a first transmitting antenna and a transmitter coupled thereto for effecting transmission of a radar signal toward a target, first and second spaced-apart receiving antennas for producing respective echo signals in response to reflections of the radar signal from the target, first and second mixers each coupled to the transmitter and to a respective one of the receiving antennas for producing respective first and second beat signals, and signal processing means coupled to the first and second mixers for producing from the first and second beat signals respective first and second summation signals representing target information, characterized in that said radar system further comprises:
  (a) simulated-echo producing means for producing a simulated target echo signal representing a target at a predetermined range which is outside a selected surveillance range interval of the radar system;
  (b) a second transmitting antenna, coupled to the simulated-echo producing means and located at a predetermined position with respect to the receiving antennas for transmitting the simulated target echo signal toward the receiving antennas;
  (c) range gating means coupled to the signal processing means for distinguishing between components of the first summation signal representing a target in the selected surveillance range interval and the simulated target at the predetermined range;
  (d) phase comparison means coupled to the range gating means and to the signal processing means for producing a first phase signal representing the phase difference between the first summation signal components representing the target in the selected surveillance range and corresponding components of the second summation signal, and for producing a second phase signal representing the phase difference between the first summation signal components representing the simulated target and corresponding components of the second summation signal, said latter phase difference representing a phase error of the system;
  (e) bearing detecting means coupled to the phase comparison means for producing from the first phase signal a target bearing signal representing the bearing of the target in the selected surveillance range; and (f) phase correction means coupled to the phase comparison means and responsive to the second phase signal to correct for the system phase error, thereby substantially eliminating the affect of said error from the target bearing signal.

2. A radar system as in claim 10 where the phase comparison means comprises first and second elements for separately producing the first and second phase signals.

3. A radar system as in claim 1 where the phase comparison means comprises a single element for producing both of the first and second phase signals, said system further including switching means for alternately coupling said phase comparison means to the bearing detection means and the phase correction means.

4. A radar system as in claim 1, 2 or 3 where the simulated echo producing means comprises a single-side-band modulator.

5. A radar system as in claim 1, 2 or 3 where the phase correction means includes a phase shifter coupled to one of the first and second mixers.

6. A radar system as in claim 1 or 2 where the bearing detecting means and the phase correction means are included in a bearing determining element.

7. A radar system as in claim 1, 2 or 3 where the second transmitting antenna is equidistant from the first and second receiving antennas.

8. A radar system as in claim 1, 2 or 3 where the transmitting and receiving antennas are mounted on a stabilized platform in a missile.

9. A radar system as in claim 1, 2 or 3 where the transmitting and receiving antennas are rigidly mounted in a missile and are positioned relative to a reference axis which is parallel to an axis of said missile.

10. A radar system as in claim 1, 2 or 3 where the first transmitting antenna and the first and second receiving antennas are mounted on a stabilized platform in a missile, and where a reference axis for the second transmitting antenna is parallel to a fixed axis of the missile.

* * * * *